(12) United States Patent
Mohr et al.

(10) Patent No.: US 7,473,060 B2
(45) Date of Patent: Jan. 6, 2009

(54) CLAMPING DEVICE

(75) Inventors: Peter Mohr, Wiggenbach (DE); Wolfgang Bechteler, Biessenhofen (DE); Stephan Gast, Schwabsoien (DE); Josef Greif, Friesenried (DE); Conrad Rösch, Pfronten (DE)

(73) Assignee: Ott-Jakob Spanntechnik GmbH, Lengenwang (DE)

( * ) Notice: Subject to any disclaimer, the term of this patent is extended or adjusted under 35 U.S.C. 154(b) by 0 days.

(21) Appl. No.: 12/017,664

(22) Filed: Jan. 22, 2008

(65) Prior Publication Data

US 2008/0193243 A1    Aug. 14, 2008

(30) Foreign Application Priority Data

Feb. 12, 2007   (DE) ............... 10 2007 007 389

(51) Int. Cl.
*B23Q 5/26* (2006.01)
(52) U.S. Cl. ..................................... 409/233
(58) Field of Classification Search ................. 409/233, 409/231, 232; 408/239 A, 239 R
See application file for complete search history.

(56) References Cited

U.S. PATENT DOCUMENTS

| | | | |
|---|---|---|---|
| 4,708,547 A | | 11/1987 | Baron |
| 4,759,113 A | * | 7/1988 | Hunkeler ..................... 409/233 |
| 5,303,594 A | | 4/1994 | Kurtz et al. |
| 5,741,981 A | | 4/1998 | Ling et al. |
| 5,783,887 A | * | 7/1998 | Ueyama et al. ............ 310/90.5 |
| 6,354,776 B1 | * | 3/2002 | Selci .......................... 409/233 |
| 6,481,940 B2 | * | 11/2002 | Prust et al. .................. 409/233 |
| 7,393,311 B1 | * | 7/2008 | Giovanelli et al. ........... 409/233 |
| 2002/0164220 A1 | * | 11/2002 | Sailing ........................ 409/233 |
| 2006/0239788 A1 | * | 10/2006 | Hyun ........................... 409/233 |
| 2008/0080943 A1 | * | 4/2008 | Bernhard et al. ............ 409/233 |

FOREIGN PATENT DOCUMENTS

| | | |
|---|---|---|
| DE | 10031027 A1 * | 1/2002 |
| DE | 10 2004 026 438 A1 | 12/2005 |
| EP | 0 339 321 | 11/1989 |

\* cited by examiner

*Primary Examiner*—Erica E Cadugan
(74) *Attorney, Agent, or Firm*—Martin Fleit; Paul Bianco; Fleit Gibbons Gutman Bongini & Bianco PL

(57) ABSTRACT

The subject matter of the present invention relates to a clamping device for clamping a tool or a tool holder (2) in a machine spindle (1), comprising a drawbar (6) that can axially move back and forth between a clamping position and a release position, a clamping spring (18) for actuating the drawbar (6) in the direction of the clamping position, a minimum of one sensor (20) for monitoring the clamping force, and a clamping cone (8) having a plurality of clamping elements (9) that rest against its outside surface, which clamping elements, via the axial movement of the clamping cone (8) by means of the drawbar (6), can be moved back and forth between a clamping position in which the tool or tool holder (2) is retained and a release position in which the tool or tool holder (2) is released. To make possible an easy and reliable transmission of the measured data acquired by the sensor throughout the operating range of the clamping device, a transponder assembly (26, 27) with a stationary stator ring (27) and a rotor ring (26) that can be axially moved by the lifting movement of the drawbar (6) within the stator ring (27) is dedicated to the sensor (20) for the wireless transmission of data and energy.

10 Claims, 2 Drawing Sheets

CLAMPING DEVICE

CROSS REFERENCE TO RELATED APPLICATION

This application claims priority under 35 U.S.C. §119 to German Patent Application No. 10 2007 007 389.7 filed Feb. 12, 2007, the entire contents of which are incorporated herein by reference.

FIELD OF THE INVENTION

The subject matter of the present invention relates to a clamping device for clamping a tool or tool holder in a machine spindle, in particular in a machine tool.

BACKGROUND OF THE INVENTION

A clamping device of this type is known from DE 10 2004 026 438 A1. Within the machine spindle of this device, a drawbar is disposed, said drawbar being able to move between a clamping position and a release position and being actuated by a clamping spring into the direction of the clamping position. On its front end, the drawbar has a clamping cone with a plurality of clamping elements which rest against the outer surface of said clamping cone and which, via the axial movement of the clamping cone by means of the drawbar, can be moved back and forth between a clamping position in which a tool or a tool holder is retained in the machine spindle and a release position in which the tool or the tool holder is released. In addition, one or more sensors for monitoring the clamping forces or clamping statuses are also disposed within the machine spindle. However, since the components of the clamping device that are disposed in the machine spindle do not only rotate but also execute a relatively large lifting movement, the transmission of the measured data acquired by the sensors between the moving and stationary components of the clumping device presents a problem.

SUMMARY OF THE INVENTION

The problem to be solved by the present invention is to make available a clamping device of the type mentioned above, which clamping device makes it possible to transmit the measured data acquired by the sensors easily and reliably within the entire operating range of the clamping device.

This problem is solved by a clamping device according to the present invention.

In the clamping device according to the present invention, a transponder assembly with a stationary stator ring and a rotor ring that is axially movable by means of the lifting movement of the drawbar within the stator ring is dedicated to the sensor or the sensors, that are disposed within the machine spindle, for the wireless transmission of data and energy. As a result, the measured data acquired by the sensor or sensors as well as the required energy to be supplied to the sensors can be contactlessly transmitted between the moving and the stationary components of the clamping device in an especially compact and space-saving design within the entire operating range of the clamping device. Thus, e.g., the clamping force can be monitored during the entire clamping procedure and during machining. In particular, no connecting lines for the transmission of energy and signals are required between the machine spindle and the drawbar that moves axially within the machine spindle.

The width of the stator ring is preferably selected to ensure that the rotor ring is located completely within the stator ring throughout the lifting range of the drawbar. This ensures a reliable energy and signal transmission throughout the lifting range of the drawbar.

To facilitate the transmission of signals between the sensor and the rotor ring, said sensor and rotor ring are preferably disposed in such a manner that they do not move relative to each other. This can be accomplished, e.g., by rigidly disposing the sensor and the rotor ring on the drawbar.

In an especially compact design, the stator ring is integrated into a housing section of a release unit that is disposed on the rear end of the drawbar. However, the stator ring can also be accommodated in a separate housing.

The sensor is preferably designed to have the form of a thrust ring with a plurality of foil strain gauges. However, it is also possible to use different types of sensors. The sensor is preferably disposed between the clamping spring and a ring shoulder of the drawbar. However, the sensor can also be disposed in other suitable locations within the machine spindle.

BRIEF DESCRIPTION OF THE DRAWINGS

Additional special features and advantages of the present invention will follow from the description of a preferred practical example based on the drawing below. As can be seen.

DETAILED DESCRIPTION OF THE INVENTION

Figure 1:
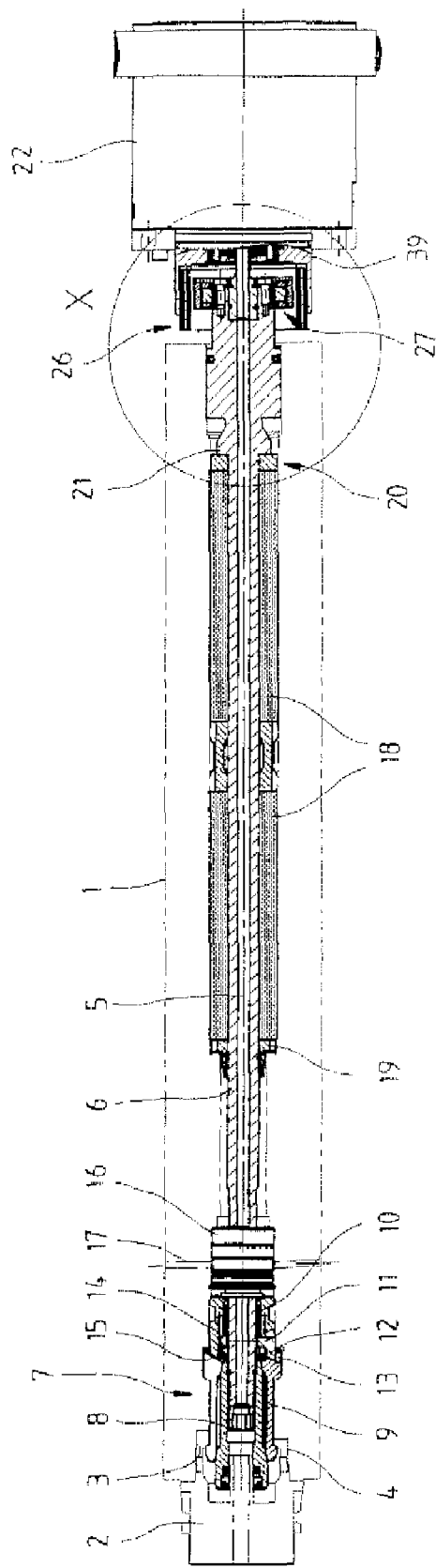
FIG. 1 shows a longitudinal section through a machine spindle of a machine tool with a clamping device according to the present invention.

FIG. 1 shows a longitudinal section through a hollow cylindrical machine spindle 1 (as identified by the broken line) of a machine tool with an integrated clamping device for clamping a tool or tool holder 2. On the left front end as viewed in FIG. 1, the machine spindle 1 has an inner cone 3 which is designed to engage a conical shaft 4 of the tool or tool holder 2, which conical shaft in this case has the form of a hollow shaft cone.

The clamping device comprises a drawbar 6, which is disposed within the machine spindle 1 so as to be concentric with respect to the center axis 5 of said machine spindle and which can move in the axial direction, as well as a clamping set 7 which is disposed on the left front end of the drawbar 6 as viewed in FIG. 1. The clamping set 7 comprises a clamping sleeve or a clamping cone 8 that is attached to the front end of the drawbar 6 as well as a plurality of clamping elements 9 which rest against the outer surface of the clamping cone 8, said clamping elements having the shape of tong segments which extend parallel to the center axis 5 of the machine spindle 1 and which are moved, via an axial movement of the clamping cone 8 in a position parallel to the center axis 5 of the machine spindle 1, between a radially inner release position and a radially outer clamping position.

By means of a spacer that is disposed on the rear end of the clamping elements 9, the clamping elements 9, in the circumferential direction, are kept at a predetermined distance from one another. The spacer comprises an axially movable crown-shaped first guide sleeve 11 which can be actuated by a spring 10 in the direction of the clamping elements 9 and which, on its end facing the clamping elements 9, has a plurality of shoulders 12 which project in the axial direction and are spaced at identical intervals in the circumferential direction, said shoulders having tapered guide surfaces on their front end. The shoulders 12 of the guide sleeve 11 engage in a groove 13 on the rear end of the clamping elements 9 and rest with their tapered front surface against a mating tapered surface in the base of the groove 13. In addition, the spacer comprises a stationary second guide sleeve 14 which, relative to the guide surfaces of the first guide sleeve 11, has oppositely inclined front guide surfaces 15 that rest against mating surfaces on the rear end of the clamping elements 9. The configuration and the mode of functioning, of the clamping set are explained in detail in DE 100 31 027. Thus, express reference is hereby made to this prior printed publication.

Adjacent to the clamping set 7, a sleeve 16 for delivering a medium that is channeled through the drawbar 6 to radial boreholes 17 is disposed above the drawbar 6. Via the sleeve 16, e.g., the coolant or another working fluid that is channeled through the drawbar to the workpiece can be rerouted at predetermined positions of the drawbar 6 and can be discharged through the radial bore holes 17. By means of a clamping spring 18 that is disposed concentrically about the drawbar, the clamping cone 8 is pre-tensioned via the drawbar 6 in the rearward direction into the clamping position as viewed in FIG. 1. In the embodiment shown in the figure, the clamping spring 18 has the form of a gas pressure spring. However, the clamping spring 18 can also be designed in the form of a cup spring assembly or the like. On one side, the clamping spring 18 is braced against a bearing disk 19 that is supported within the machine spindle 1 and on the other side, it is braced via a ring-shaped sensor 20 against a ring shoulder 21 that is located on the rear end of the drawbar 6. The sensor 20 monitors the clamping force of the clamping device, which will be explained in greater detail below. The drawbar 6 is hollow so as to be able to channel a working fluid to the tool or tool holder 2. On the right rear end of the drawbar 6 as viewed in FIG. 1, a release unit 22 is disposed, through which release unit the drawbar 6 can be pushed in the forward direction against the force of the clamping spring 18 so as to release the clamping set 7.

Figure 2:
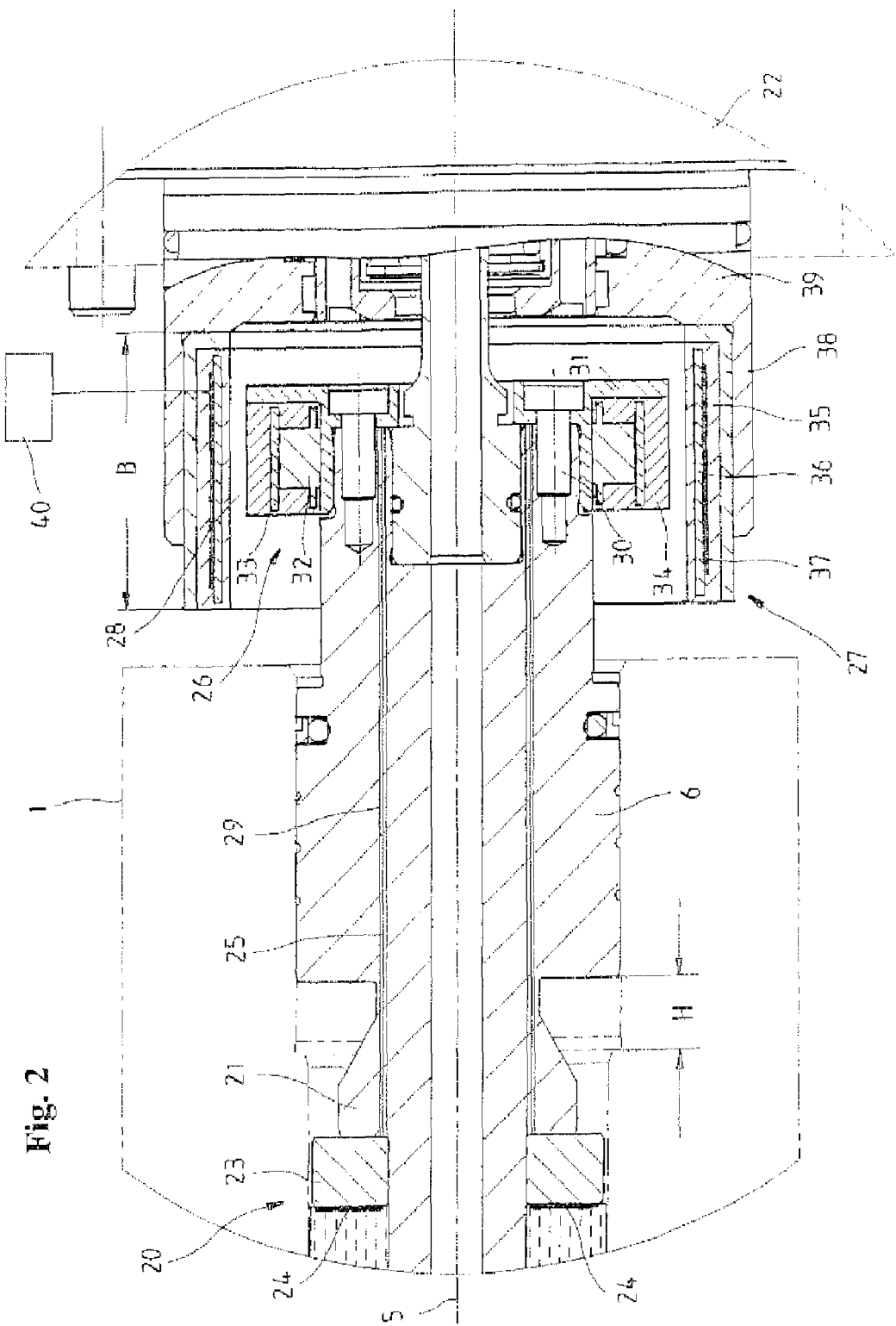
FIG. 2 is an enlarged detail view of section X in FIG. 1.

As can be seen in FIG. 2, the sensor 20 in the embodiment shown has the form of a thrust ring 23 with a plurality of foil strain gauges 24 that are disposed on the front end. The foil strain gauges 24 are connected via lines 25 to a rotor ring 26 which is attached to the rear end of the drawbar 6 and which is disposed within a stator ring 27 at a distance from said stator ring, said distance being defined by an annular clearance 28, with said rotor ring and said stator ring forming a transponder assembly for the wireless transmission of data and energy between the rotating and stationary components of the clamping device. The lines 25 are accommodated without being kinked in boreholes 29 of the drawbar 6, with said boreholes running parallel to the center axis 5 of the machine spindle 1, and are therefore protected even without a separate protective cover.

The rotor ring 26 comprises a supporting ring 31 which is attached via screws 30 to the rear end of the drawbar 6 and on which a circuit configuration 32 with a transmitter module for the contactless transmission of the measured data to the stator ring 27 as well as a transmitter coil 33 for the contactless transmission of energy from the stator ring 27 for supplying the circuit configuration 32 with energy are accommodated. In addition, the circuit configuration 32 can also comprise an electronic module for processing and relaying the signals generated by the sensor 20 to the transmitter module. Optionally, the signals generated by the sensor can already be preliminarily processed in the circuit configuration 32. The transmitter module is preferably a radio module in the radio frequency range. The circuit configuration 32 and the transmitter coil 33 are disposed on the supporting ring 31 and protected by a surrounding sealing compound 34. The stationary stator ring 27 also comprises a supporting ring 38 which has on its inner surface a coil 36 for the contactless energy transmission to the rotor ring 26 as well as a circuit configuration 37 with receiver module for the signals transmitted by the transmitter module within a sealing compound 35. In the embodiment shown, the stator ring 27 is accommodated in a cup-shaped housing section 39 of the release unit. In addition to a receiver module, the circuit configuration 37 can also comprise an electronic analyzer unit for the preliminary processing of the received data and is connected to an external supply and control unit 40.

According to FIG. 2, the width B of the stator ring 27 is selected so as to ensure that throughout the lifting range H of the drawbar 6, i.e., the range of the movement of the drawbar 6 between the clamping position and the release position, the rotor ring 26 is located completely within the stator ring 27. This ensures a reliable energy and signal transmission throughout the lifting range of the drawbar 6.

The clamping device described above operates in the following manner:

In the clamping position shown in FIG. 1, the clamping cone 8 is drawn via the drawbar 6 and the clamping spring 18 into the machine spindle 1. In this position, the clamping elements 9 are pushed radially outwardly, with the tool or the tool holder 2 being retained in the machine spindle 1.

To release the clamping device, the clamping cone 8 is moved. e.g., by the hydraulically or electrically actuated release unit 22, out of the clamping position shown in FIG. 1 into the direction of the tool or tool holder 2. Because of the forward movement of the clamping cone 8 into the direction of the tool or tool holder 2, the clamping elements 9 that rest against the outside surface of the clamping cone 8 are moved parallel to the inside and thus release the tool or the tool holder 2.

The sensor 20 monitors the clamping pressure of the clamping spring 18. The data acquired by the sensor 20 are contactlessly transmitted from the rotor ring 27 to the stator ring 26 and from there can be transmitted to an analyzer and control unit 40. In this unit, the signals can be further processed and can be transmitted to a machine control or the like. The analyzer and control unit 40 can also comprise a display unit so as to be able to display the clamping pressure or the clamping statuses.

The clamping device according to the present invention is not limited to the practical example described above. Thus, the sensor 20 can also be integrated into other suitable locations within the machine spindle or directly into the clamping elements. Furthermore, the clamping force monitoring unit can also be used in clamping systems with a steep angle cone.

The invention claimed is:

1. A clamping device for clamping a tool or tool holder (2) in a machine spindle (1), comprising a drawbar (6) that has a longitudinal axis and that can axially move between a clamping position and a release position, a clamping spring (18) for actuating the drawbar (6) in the direction of the clamping position, a minimum of one sensor (20) that is disposed within the machine spindle (1) for monitoring the clamping force, and a clamping cone (8) disposed on the front end of the drawbar (6) and having a plurality of clamping elements (9) resting against its outside surface, which clamping elements, via the axial movement of the clamping cone (8) by means of the drawbar (6), can be moved back and forth between a clamping position in which the tool or tool holder (2) is retained and a release position in which the tool or tool holder (2) is released, characterized in that a transponder assembly (26, 27) with a stationary stator ring (27) and a rotor ring (26) that can be axially moved within the stator ring (27) by the lifting movement of the drawbar (6) is dedicated to the sensor (20) for the wireless transmission of sensed data and of energy.

2. The clamping device as in claim 1, characterized in that the width B of the stator ring (27) is selected to ensure that the rotor ring (26) throughout the lifting range (H) of the drawbar (6) is located completely within the stator ring (26).

3. The clamping device as in claim 1, characterized in that the sensor (20) and the rotor ring (26) are disposed in such a manner that they cannot move relative to each other.

4. The clamping device as in claim 1, characterized in that the stator ring (27) is accommodated in a housing section (39) of a release unit (22) that is disposed on the rear end of the drawbar (6).

5. The clamping device as in claim 1, characterized in that the rotor ring (26) comprises a transmitter coil (33) for the contactless transmission of energy from the stator ring (27) as well as a circuit configuration (32) with a transmitter module for the contactless transmission of the sensed data.

6. The clamping device as in claim 5, characterized in that the transmitter coil (33) and the circuit configuration (32) are disposed on a supporting ring (31) that is attached to the rear end of the drawbar (6) and are surrounded by a sealing compound (34).

7. The clamping device as in claim 1, characterized in that the stator ring (27) comprises a coil (36) for the contactless transmission of energy to the rotor ring (26) as well as a circuit configuration (37) with a receiver module for receiving the contactlessly transmitted sensed data.

8. The clamping device as in claim 7, characterized in that the coil (36) and the circuit configuration (37) are disposed on a stationary supporting ring (38) and are surrounded by a sealing compound (35).

9. The clamping device as in claim 1, characterized in that the sensor (20) has the form of a thrust ring (23) with a plurality of foil strain gauges (24).

10. The clamping device as in claim 1, characterized in that the sensor (20) is disposed between the clamping spring (18) and a ring shoulder (21) of the drawbar (6).

* * * * *